(12) United States Patent
He et al.

(10) Patent No.: US 11,391,636 B2
(45) Date of Patent: Jul. 19, 2022

(54) DISPLAY DEVICE AND METHOD FOR FABRICATING SAME

(71) Applicant: WUHAN CHINA STAR OPTOELECTRONICS SEMICONDUCTOR DISPLAY TECHNOLOGY CO., LTD., Hubei (CN)

(72) Inventors: Jiaqing He, Hubei (CN); Hao Peng, Hubei (CN)

(73) Assignee: WUHAN CHINA STAR OPTOELECTRONICS SEMICONDUCTOR DISPLAY TECHNOLOGY CO., LTD, Hubei (CN)

( * ) Notice: Subject to any disclaimer, the term of this patent is extended or adjusted under 35 U.S.C. 154(b) by 131 days.

(21) Appl. No.: 16/770,587

(22) PCT Filed: Dec. 3, 2019

(86) PCT No.: PCT/CN2019/122547
§ 371 (c)(1),
(2) Date: Jun. 5, 2020

(87) PCT Pub. No.: WO2021/072933
PCT Pub. Date: Apr. 22, 2021

(65) Prior Publication Data
US 2021/0404888 A1    Dec. 30, 2021

(30) Foreign Application Priority Data

Oct. 14, 2019 (CN) .......................... 201910973644.1

(51) Int. Cl.
*G01L 1/14* (2006.01)
*G01L 1/22* (2006.01)
*G01L 1/24* (2006.01)

(52) U.S. Cl.
CPC .................. *G01L 1/14* (2013.01); *G01L 1/22* (2013.01); *G01L 1/24* (2013.01)

(58) Field of Classification Search
CPC ................ G01L 1/14; G01L 1/22; G01L 1/24
See application file for complete search history.

(56) References Cited

U.S. PATENT DOCUMENTS 10,551,880 B1 * 2/2020 Ai .................... H04M 1/0216
11,194,121 B2 * 12/2021 Lee ............................ G02B 7/08
(Continued)

FOREIGN PATENT DOCUMENTS

| CN | 104272219 A | 1/2015 |
| CN | 104583905 A | 4/2015 |

(Continued)

*Primary Examiner* — Max H Noori
(74) *Attorney, Agent, or Firm* — Dickinson Wright PLLC

(57) ABSTRACT

The present invention provides a display device and a method for fabricating the same. The display device includes a display area, a bending area, one or more strain sensors disposed on the bending area and configured to detect one or more characteristic parameters of the bending area when the bending area is bent, and a control module connected to the one or more strain sensors and configured to obtain a deformation parameter of a film layer to be detected in the bending area according to the one or more characteristic parameters.

7 Claims, 4 Drawing Sheets

(56) References Cited

U.S. PATENT DOCUMENTS

| | | |
|---|---|---|
| 2002/0126086 A1 | 9/2002 | Takeuchi et al. |
| 2014/0049463 A1 | 2/2014 | Seo et al. |
| 2014/0098095 A1* | 4/2014 | Lee .................. G09G 3/20 |
| | | 345/420 |
| 2015/0220119 A1 | 8/2015 | Seo et al. |
| 2015/0277645 A1 | 10/2015 | Li et al. |
| 2015/0292965 A1* | 10/2015 | Sato .............. G01L 1/2262 |
| | | 73/818 |
| 2016/0231784 A1 | 8/2016 | Yu et al. |
| 2017/0097660 A1 | 4/2017 | Alonso et al. |
| 2017/0160899 A1 | 6/2017 | Seo et al. |
| 2017/0207412 A1 | 7/2017 | Jeong et al. |
| 2018/0074675 A1 | 3/2018 | Soh et al. |
| 2018/0082632 A1* | 3/2018 | Lee ..................... G09G 3/035 |
| 2018/0158741 A1* | 6/2018 | Kim .................... G09G 3/006 |
| 2018/0246544 A1 | 8/2018 | Kwon et al. |
| 2019/0221774 A1 | 7/2019 | Jeon et al. |
| 2019/0333982 A1 | 10/2019 | Choi et al. |
| 2019/0369671 A1 | 12/2019 | Seo et al. |
| 2020/0135595 A1 | 4/2020 | Kim et al. |
| 2020/0209922 A1 | 7/2020 | Lu et al. |
| 2020/0285280 A1 | 9/2020 | Zeng et al. |

FOREIGN PATENT DOCUMENTS

| | | |
|---|---|---|
| CN | 104737100 A | 6/2015 |
| CN | 104951054 A | 9/2015 |
| CN | 105830140 A | 8/2016 |
| CN | 106328599 A | 1/2017 |
| CN | 106383555 A | 2/2017 |
| CN | 106455371 A | 2/2017 |
| CN | 106847099 A | 6/2017 |
| CN | 107331300 A | 11/2017 |
| CN | 107340085 A | 11/2017 |
| CN | 107425036 A | 12/2017 |
| CN | 107702636 A | 2/2018 |
| CN | 107871451 A | 4/2018 |
| CN | 207182247 U | 4/2018 |
| CN | 108139775 A | 6/2018 |
| CN | 108154800 A | 6/2018 |
| CN | 108267077 A | 7/2018 |
| CN | 108335633 A | 7/2018 |
| CN | 108364602 A | 8/2018 |
| CN | 108417152 A | 8/2018 |
| CN | 108571925 A | 9/2018 |
| CN | 108881639 A | 11/2018 |
| CN | 109256412 A | 1/2019 |
| CN | 109427816 A | 3/2019 |
| CN | 109461382 A | 3/2019 |
| CN | 109544725 A | 4/2019 |
| CN | 109671718 A | 4/2019 |
| CN | 109696119 A | 4/2019 |
| CN | 109755222 A | 5/2019 |
| CN | 110047379 A | 7/2019 |
| CN | 110060573 A | 7/2019 |
| CN | 110065267 A | 7/2019 |
| EP | 1220189 A2 | 7/2002 |
| KR | 20180029477 A | 3/2018 |

* cited by examiner

DISPLAY DEVICE AND METHOD FOR FABRICATING SAME

FIELD OF INVENTION

The present invention relates to the technical field of display, and particularly to a display device and a method for fabricating the same.

BACKGROUND

A current display device comprises a display area and a welding area disposed on a lower side of the display area. In order to reduce a size of a frame of the display device, the welding area is usually bent to a back of the display area to form a bending area.

In order to design thinner products, on one hand, a radius of curvature of the bending area needs to be reduced, and on the other hand, thickness of the bending area needs to be reduced as much as possible. Therefore, metal wires and film layers in the bending area are easily broken. In addition, when the display device is lighter and thinner, protective components such as a shell become more fragile. As a result, when the display device is bumped during use, it is easy to transfer force to the bending area, causing the bending area to deform (such as twisting) or break. This causes the display device to have different degrees of damage such as poor display effect and inability to light.

Currently, there is no method for detecting a deformation parameter of the bending area, so a structure of the display device cannot be adjusted, and the bending area is easily damaged.

Therefore, it is necessary to provide a display device and a method for fabricating the same to solve the problems in the prior art.

SUMMARY OF DISCLOSURE

An object of the present invention is to provide a display device and a method for fabricating the same, which can prevent a bending area from being damaged.

In order to solve the above technical problems, the present invention provides a display device comprising:

a display area;

a bending area;

one or more strain sensors disposed in a middle region of the bending area and configured to detect one or more characteristic parameters of the bending area when the bending area is bent, wherein the one or more characteristic parameters comprise at least one of a resistance change amount, a capacitance change amount, an inductance change amount, and a light intensity change amount, and the one or more strain sensors comprise at least one of a resistive strain sensor, a capacitive strain sensor, an inductive strain sensor, and an optical strain sensor; and a control module connected to the one or more strain sensors and configured to obtain a deformation parameter of a film layer to be detected in the bending area according to the one or more characteristic parameters.

The present invention further provides a display device comprising:

a display area;

a bending area;

one or more strain sensors disposed on the bending area and configured to detect one or more characteristic parameters of the bending area when the bending area is bent, wherein the one or more characteristic parameters comprise at least one of a resistance change amount, a capacitance change amount, an inductance change amount, and a light intensity change amount; and a control module connected to the one or more strain sensors and configured to obtain a deformation parameter of a film layer to be detected in the bending area according to the one or more characteristic parameters.

The present invention further provides a method for fabricating a display device. The method comprises:

forming a display device comprising a display area and a bending area;

detecting one or more characteristic parameters of the bending area when the bending area is bent, wherein the one or more characteristic parameters comprise at least one of a resistance change amount, a capacitance change amount, an inductance change amount, and a light intensity change amount;

obtaining a deformation parameter of a film layer to be detected in the bending area according to the one or more characteristic parameters; and adjusting a deformation amount of the bending area to satisfy a preset condition according to the deformation parameter.

The present invention provides a display device and a method for fabricating the same. The display device comprises a display area, a bending area, one or more strain sensors disposed on the bending area and configured to detect one or more characteristic parameters of the bending area when the bending area is bent, and a control module connected to the one or more strain sensors and configured to obtain a deformation parameter of a film layer to be detected in the bending area according to the one or more characteristic parameters. Due to addition of the one or more strain sensors and the control module, a deformation parameter of each film layer in the bending area can be detected, thereby facilitating adjustment of the deformation amount of the bending area to satisfy a preset condition. This prevents the bending area from being damaged and improves product yield.

DETAILED DESCRIPTION

Figure 1:
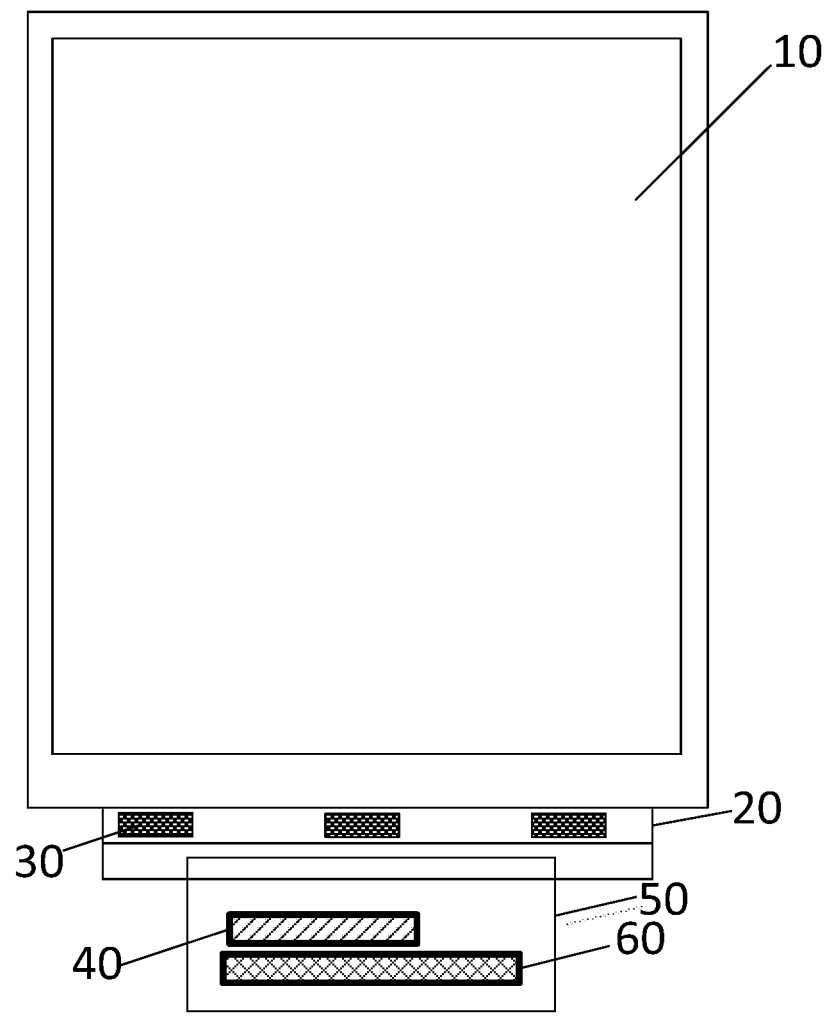
FIG. 1 is a schematic structural diagram of a display device in an unfolded state according to the present invention.

The following description of various embodiments of the present invention with reference to the accompanying drawings is used to illustrate specific embodiments that can be practiced. Directional terms mentioned in the present disclosure, such as "above", "below", "front", "back", "left", "right", "inside", "outside", "side", are merely used to indicate the direction of the accompanying drawings. Therefore, the directional terms are used for illustrating and understanding the present invention rather than limiting the present invention. In the figures, elements with similar structures are indicated by the same reference numerals.

As shown in FIG. 1, a display device of the present invention comprises a display area 10, a bending area 20, three strain sensors 30, and a control module 40. The display device may further comprise a chip-on-film structure 50 and a flexible printed circuit 60.

The display area 10 is configured to display a screen. The bending area 20 is disposed on a lower side of the display area 10. A side of the bending area 20 is connected to the flexible printed circuit (FPC) 60 via the chip-on-film (COF) structure 50. The bending area 20 comprises a metal layer and other film layers (not shown).

The strain sensors 30 are disposed on the bending area 20 and configured to detect one or more characteristic parameters of the bending area 20 when the bending area 20 is bent. The one or more characteristic parameters comprise at least one of a resistance change amount, a capacitance change amount, an inductance change amount, and a light intensity change amount. It can be understood that a number of the strain sensor 30 is not limited to three, and may be one, two, or more than three.

Figure 2:
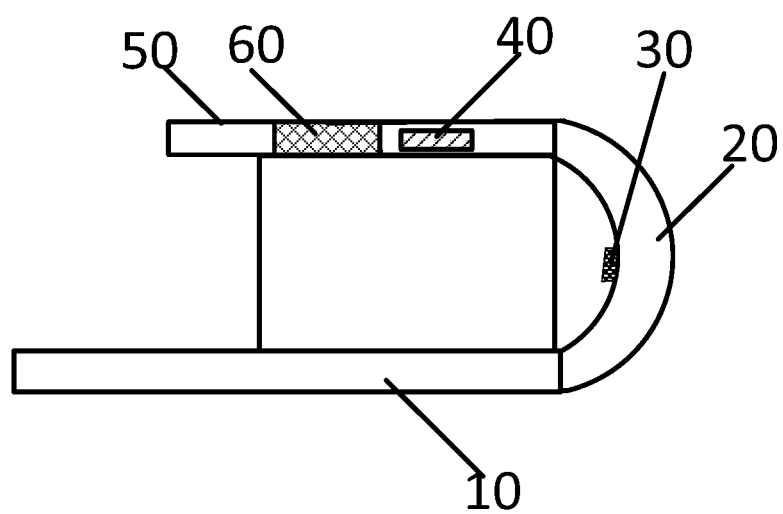
FIG. 2 is a first schematic structural diagram of a display device in a folded state according to a first embodiment of the present invention.
Figure 3:
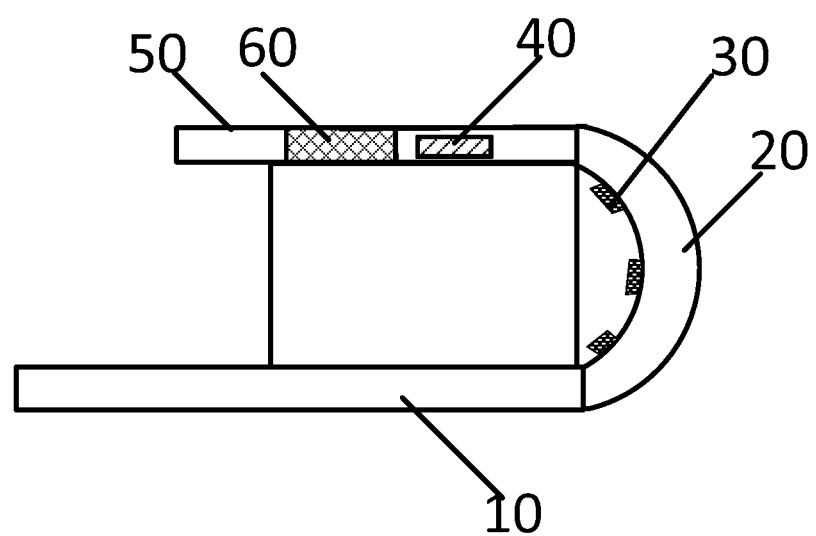
FIG. 3 is a second schematic structural diagram of the display device in the folded state according to the first embodiment of the present invention.

In an embodiment, please refer to FIG. 2, the strain sensor 30 may be disposed on an inner surface of the bending area 20, and may be disposed in a middle region of the bending area 20 (that is, a region where curvature is the largest). Please refer to FIG. 3, in order to improve accuracy of detection, both ends of the bending area 20 may also be provided with the strain sensors 30.

Figure 4:
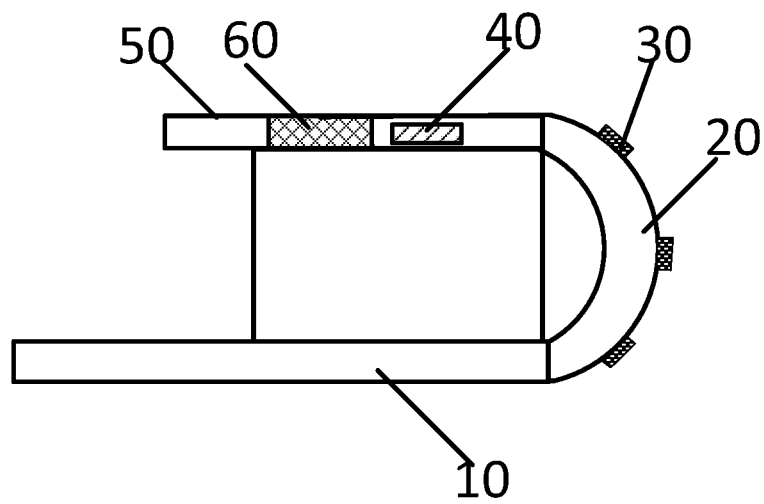
FIG. 4 is a third schematic structural diagram of the display device in the folded state according to the first embodiment of the present invention.

In another embodiment, as shown in FIG. 4, the strain sensors 30 may be disposed on an outer surface of the bending area 20. It can be understood that the strain sensors 30 may be disposed in the middle region of the bending area 20, or may be disposed at both ends and the middle region of the bending area 20. Specific arrangement of the strain sensors 30 on the outer surface is the same as that on the inner surface. It can be understood that arrangement of the strain sensors 30 is not limited. In order to improve accuracy of detecting characteristic parameters, the strain sensors 30 may be disposed on both the inner surface and the outer surface of the bending area 20. The strain sensors 30 may be adhered to the inner surface and/or the outer surface of the bending area 20 via an adhesive layer. The strain sensors 30 may comprise at least one of a resistive strain sensor, a capacitive strain sensor, an inductive strain sensor, and an optical strain sensor. The strain sensors 30 may be metal sensitive grids or strain gauges.

The control module 40 is connected to the strain sensors 30 and configured to obtain a deformation parameter of a film layer to be detected in the bending area 20 according to the one or more characteristic parameters. The film layer to be detected may be at least one of the metal layer and other film layers. Driving signals of the strain sensors 30 and the control module 40 may be provided by the flexible printed circuit 60.

Specifically, the strain sensors 30 obtain at least one of a resistance change amount, a capacitance change amount, an inductance change amount, and a light intensity change amount of the bending area 20, and transmit the change amount to the control module 40. The control module 40 analyzes the above characteristic parameters to obtain a deformation parameter, such as a deformation amount and a stress level, of the film layer to be detected in the bending area 20.

Taking the resistance change amount as an example, a strain gauge may be pasted on a surface of the bending area 20. When the bending area 20 is deformed by force, the force is transmitted to the strain gauge to change resistance of the strain gauge. The resistance change amount is converted into a readable signal by the control module 40, and the control module 40 can analyze it to obtain a deformation amount and a stress level of the metal layer of the bending area 20. The strain sensors 30 are not limited to detecting strain of the metal layer, and may also detect strain of other film layers in the bending area 20.

In an embodiment, the display device may further comprise an adjustment component (not shown), which adjusts a deformation amount of the bending area 20 to satisfy a preset condition according to the deformation parameter.

Figure 5:
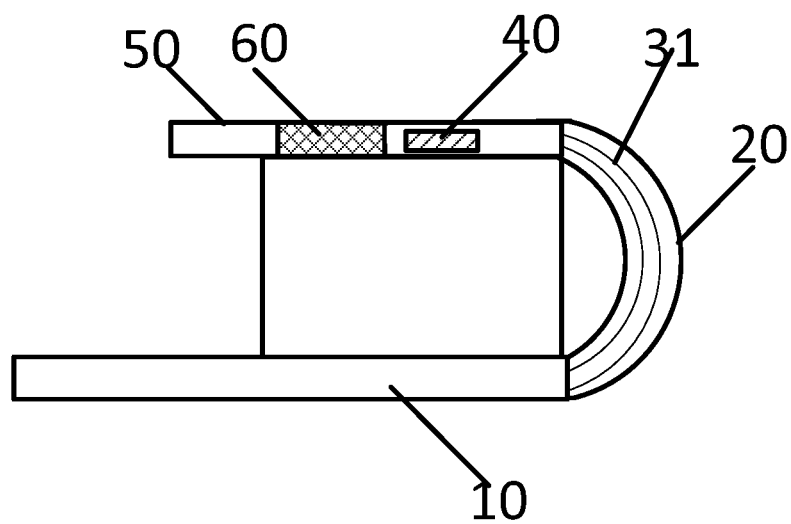
FIG. 5 is a schematic structural diagram of a display device in a folded state according to a second embodiment of the present invention.
Figure 6:
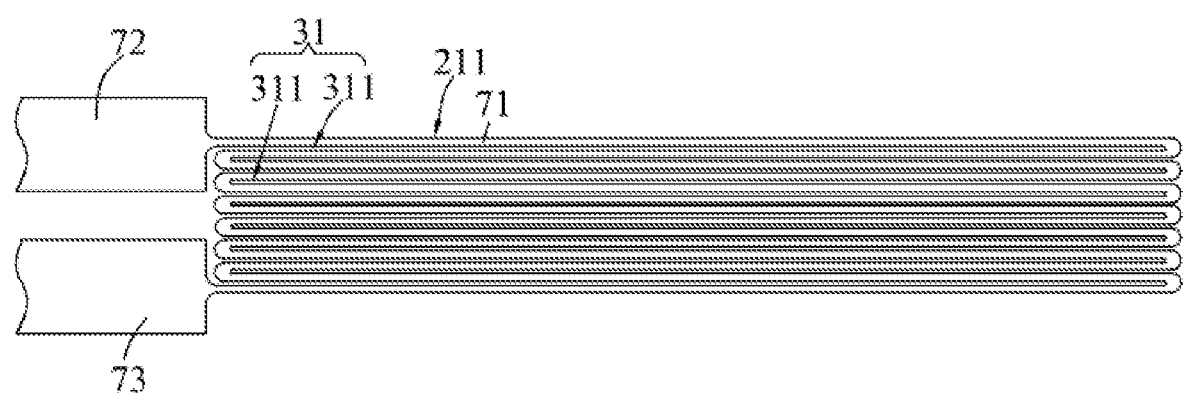
FIG. 6 is a top view of a metal layer and metal sensitive grids of the present invention.

Please refer to FIG. 5 and FIG. 6. FIG. 5 is a schematic structural diagram of a display device in a folded state according to a second embodiment of the present invention.

As shown in FIG. 5, the display device of this embodiment is different from that of the previous embodiment in that the strain sensor of this embodiment is embedded inside the bending area 20.

Please refer to FIG. 6, in an embodiment, the strain sensor is a metal sensitive grid 31. The metal sensitive grid 31 is configured to detect the resistance change amount of the bending area 20 when the bending area 20 is bent. When the strain sensor is configured to detect the resistance change amount of the bending area 20, the bending area 20 comprises a metal layer. That is, a cross-sectional structure of the bending area 20 comprises a metal layer (not shown). The strain sensor is disposed on a same layer as the metal layer, which can simplify a fabricating process and improve production efficiency.

The metal layer comprises one or more metal wires 211. Each metal wire 211 comprises a plurality of branch portions 71 arranged at intervals. The metal sensitive grid 31 is disposed in a space between two adjacent branch portions 71. The metal sensitive grid 31 may comprise a plurality of strip-shaped portions 311. Each of the strip-shaped portions 311 is disposed in a space between two adjacent branch portions 71. It can be understood that, when the strain sensor is a strain gauge, the strain gauge may also be disposed in a space between two adjacent branch portions 71. In an embodiment, the metal wires 211 may be provided with an input terminal 72 and an output terminal 73. The branch portions 71 are connected to each other end to end. A start end of a first branch portion 71 is connected to the input terminal 72. An end of a last branch portion 71 is connected to the output terminal 73. A structure of the metal sensitive grid is not limited to the aforementioned structure. It can be understood that the strain sensor may be disposed on a different layer from the metal layer.

When the strain sensor is configured to detect one of the capacitance change amount, the inductance change amount, and the light intensity change amount of the bending area 20, the strain sensor and the metal layer are disposed on different layers. Taking a detection of the capacitance change amount of the bending area 20 as an example, another metal layer may be disposed above or below the metal layer, and a flexible insulating layer is disposed between the two metal layers. When the strain sensor is configured to detect the light intensity change amount of the bending area 20, an optical fiber may be disposed inside the bending area 20. It can be understood that a specific setting manner of the strain sensor is not limited to the aforementioned manner, and other setting manners may also be adopted.

Based on the previous embodiment, since the strain sensor is embedded inside the bending area 20, values detected by the strain sensor is closer to an actual deformation amount of the film layer to be detected, thereby improving detection accuracy.

The present invention further provides a method for fabricating a display device comprising the following steps.

S101: forming a display device comprising a display area and a bending area.

As shown in FIG. 1, an unfolded display device is made. The display device comprises a display area 10 and a bending area 20. That is, a complete display device is made, and the display device is in an unfolded state. That is, the bending area 20 is not yet bent.

S102: detecting one or more characteristic parameters of the bending area when the bending area is bent.

In an embodiment, as shown in FIG. 2 to FIG. 5, when the bending area 20 is bent, one or more characteristic parameters of the bending area 20 are detected by a strain sensor 30. The one or more characteristic parameters comprise at least one of a resistance change amount, a capacitance change amount, an inductance change amount, and a light intensity change amount.

S103: obtaining a deformation parameter of a film layer to be detected in the bending area according to the one or more characteristic parameters.

For example, in an embodiment, a control module 40 obtains a deformation parameter of a film layer to be detected in the bending area 20 according to the one or more characteristic parameters. The deformation parameter may be a deformation amount and a critical threshold, and may specifically be a bending degree, a stress level, a maximum curvature, a maximum stress, and the like.

S104: adjusting a deformation amount of the bending area to satisfy a preset condition according to the deformation parameter.

For example, in order to further prevent the bending area from being damaged, this step may comprise:

S1041: adjusting at least one of a structure of the film layer and curvature of the bending area according to the deformation parameter.

For example, according to the obtained deformation parameter, the structure of the film layer and the curvature of the bending area are adjusted. For example, a buffer layer may be added or a buffer structure may be disposed on a substrate to change the structure of the film layer. Alternatively, in a subsequent bending process, the curvature is adjusted to maintain the deformation amount of the film layer to be detected within a set range, thereby preventing the bending area from being damaged during the bending process, such as a broken metal wire. Furthermore, this can prevent the bending area from being damaged when the display device is impacted. Therefore, the display device is better balanced in terms of weight, thickness, cost, and yield, and its product yield is improved.

The present invention provides a display device and a method for fabricating the same. The display device comprises a display area, a bending area, one or more strain sensors disposed on the bending area and configured to detect one or more characteristic parameters of the bending area when the bending area is bent, and a control module connected to the one or more strain sensors and configured to obtain a deformation parameter of a film layer to be detected in the bending area according to the one or more characteristic parameters. Due to addition of the one or more strain sensors and the control module, a deformation parameter of each film layer in the bending area can be detected, thereby facilitating adjustment of the deformation amount of the bending area to satisfy a preset condition. This prevents the bending area from being damaged and improves product yield.

The present application has been described in the above preferred embodiments, but the preferred embodiments are not intended to limit the scope of the present application, and those skilled in the art may make various modifications without departing from the scope of the present application. The scope of the present application is determined by claims.

What is claimed is:

1. A display device, comprising:
   a display area;
   a bending area comprising a metal layer;
   one or more strain sensors embedded inside the bending area, disposed on a same layer as the metal layer, and configured to detect a resistance change amount of the bending area when the bending area is bent; and
   a control module connected to the one or more strain sensors and configured to obtain a deformation parameter of a film layer to be detected in the bending area according to the resistance change amount.

2. The display device according to claim 1, wherein the one or more strain sensors are metal sensitive grids.

3. The display device according to claim 2, wherein the metal layer comprises one or more metal wires, each metal wire comprises a plurality of branch portions arranged at intervals, and each strain sensor is disposed in a space between two adjacent branch portions.

4. The display device according to claim 1, wherein the one or more strain sensors are disposed in a middle region of the bending area.

5. The display device according to claim 4, wherein the one or more strain sensors are also disposed at both ends of the bending area.

6. A method for fabricating a display device, comprising:
   forming a display device comprising a display area and a bending area;
   detecting one or more characteristic parameters of the bending area when the bending area is bent, wherein the one or more characteristic parameters comprise at least one of a resistance change amount, a capacitance change amount, an inductance change amount, and a light intensity change amount;
   obtaining a deformation parameter of a film layer to be detected in the bending area according to the one or more characteristic parameters; and
   adjusting a deformation amount of the bending area to satisfy a preset condition according to the deformation parameter.

7. The method for fabricating the display device according to claim 6, wherein the step of adjusting the deformation amount of the bending area to satisfy the preset condition according to the deformation parameter comprises:
   adjusting at least one of a structure of the film layer and curvature of the bending area according to the deformation parameter.

* * * * *